US006391987B1

United States Patent
Tincul et al.

(12)

(10) Patent No.: US 6,391,987 B1
(45) Date of Patent: May 21, 2002

(54) GAS-PHASE POLYMERIZATION PROCESS FOR PRODUCING PROPYLENE/1-PENTENE COPOLYMERS

(75) Inventors: Ioan Tincul, Sasolburg; Ignatius Hendrik Potgieter, Vanderbijlpark; Dawid Johannes Joubert, Sasolburg; Antonie Hermanus Potgieter, Johannesburg, all of (ZA)

(73) Assignee: Sasol Technology (Proprietary) Limited (ZA)

( * ) Notice: Subject to any disclaimer, the term of this patent is extended or adjusted under 35 U.S.C. 154(b) by 0 days.

(21) Appl. No.: 09/470,219

(22) Filed: Dec. 22, 1999

Related U.S. Application Data

(63) Continuation of application No. PCT/GB98/01969, filed on Jul. 3, 1998.

(30) Foreign Application Priority Data

Jul. 4, 1997 (ZA) ............................................. 97/5997

(51) Int. Cl.[7] ............................. C08F 4/614; C08F 4/642
(52) U.S. Cl. .................... 526/91; 526/124.3; 526/124.9; 526/125.6; 526/348; 526/348.6
(58) Field of Search .............................. 526/91, 124.3, 526/348, 348.6, 124.9, 125.6

(56) References Cited

U.S. PATENT DOCUMENTS 4,970,279 A * 11/1990 Bailly et al. ................... 526/63
5,618,895 A * 4/1997 Kerth et al. ................. 526/128

FOREIGN PATENT DOCUMENTS

| WO | 9624623 | 8/1996 |
| ZA | 956684 | 8/1995 |

* cited by examiner

*Primary Examiner*—David W. Wu
*Assistant Examiner*—R. Rabago
(74) *Attorney, Agent, or Firm*—Ladas & Parry

(57) ABSTRACT

Process for producing a propylene/1-pentene polymer in the presence of a Ziegler-Natta catalyst system with the monomer reactants being in the vapor phase while the reaction is in process and with no liquid component being present in the reaction zone while the reaction is in progress. Different ways of introducing the reactants are disclosed (partly in liquid phase then immediately evaporated or not, preheated or not, mixed with the comonomer or not).

32 Claims, No Drawings

GAS-PHASE POLYMERIZATION PROCESS FOR PRODUCING PROPYLENE/1-PENTENE COPOLYMERS

This application is a continuation of International Application PCT/GB98/01969 filed on Jul. 3, 1998, and which designated the U.S., claims the benefit thereof and incorporates the same by reference.

THIS INVENTION relates to polymerization. It relates in particular to a process for producing a propylene/1-pentene polymer, and to a polymer produced in such a process.

According to a first aspect of the invention, there is provided a process for producing a propylene/1-pentene polymer, which process comprises reacting propylene, as a first monomer reactant, with 1-pentene, as a second monomer reactant, in a reaction zone, in the presence of a Ziegler-Natta catalyst or catalyst system, to form the propylene/1-pentene polymer, with the reactants being in the vapour phase in the reaction zone while the reaction is in progress, and with no liquid component being present in the reaction zone while the reaction is in progress.

While the temperature in the reaction zone, ie the reaction temperature, can be in the range of 10° C. to 130° C., it is preferably in the range of 40 to 110° C., still more preferably in the range of 60° to 90° C.

While the pressure in the reaction zone, ie the reaction pressure can be in the range of 1 to 60 kg/cm$^2$, it is preferably in the range of 3 to 40 kg/cm$^2$, more preferably in the range of 6 to 30 kg/cm$^2$.

The reaction zone may be stirred while the reaction is in progress. Preferably, the stirring of the reaction zone may be effected by means of a mechanical type of stirrer. Most preferred is a stirred reaction zone which provides an upward movement of the copolymer particles which are produced therein, without sedimentation of these particles at the bottom of the reaction zone occurring to a significant degree.

The reaction of propylene and 1-pentene is exothermic, and the process may thus include, if necessary, removing at least some of the heat of reaction. The removal of the heat of reaction may be effected by providing. internal or external coolers to the reaction zone; by withdrawing a portion of the gaseous monomer reactants from the reaction zone, cooling this portion, and recycling this portion to the reaction zone in cooled or liquefied form; or the like.

The reaction will be continued for a sufficient period of time to obtain a desired degree of conversion of the monomer reactants, hereinafter also referred to as monomers for brevity. Typically, the conversion can be in the range of 1% to 99%. Thus, the reaction time may be between 10 minutes and 48 hours, preferably between 20 minutes and 200 minutes.

The Applicant has found that different methods of introducing the monomer reactants into the reaction zone, give different performances of the process. Thus, the 1-pentene may be introduced into the reaction zone in vapour phase or it can be introduced into the reaction zone at least partially in liquid phase, with the liquid phase being evaporated in the reaction zone.

In one embodiment of the invention, both the monomer reactants may be introduced into the reaction zone in the vapour phase. Thus, the monomer reactants can then be preheated prior to introducing them into the reaction zone, to ensure that they are in vapour phase.

In one version of this embodiment of the invention, the propylene and 1-pentene may be preheated separately and introduced separately into the reaction zone.

In another version of this embodiment of the invention, the propylene and 1-pentene may be preheated separately, thereafter admixed, and then introduced together, ie as an admixture, into the reaction zone.

In still another version of this embodiment of the invention, the propylene and 1-pentene may be preheated together, ie after combining them to form an admixture, and thereafter introduced together, ie as the admixture, into the reaction zone.

In another embodiment of the invention, the monomer reactant(s) may be introduced into the reaction zone partly in the vapour phase, so that part of the monomer reactant(s) are introduced into the reaction zone in liquid phase, with this part being further evaporated in the reaction zone so that the reaction is performed with both monomer reactants in the vapour phase.

In one version of this embodiment of the invention, the propylene may be introduced into the reaction zone in the vapour phase, while the 1-pentene is introduced into the reaction zone separately in the liquid phase in such an amount that it rapidly evaporates in the reaction zone so as also to be in the vapour phase.

In another version of this embodiment of the invention, a major proportion of both propylene and 1-pentene may be introduced into the reaction zone in vapour phase, while a minor proportion of each of the monomers is introduced into the reaction zone in liquid phase in such an amount that it rapidly evaporate in the reaction zone so as also to be in the vapour phase.

It will thus be appreciated that while a portion of at least one of the monomer reactants can be introduced into the reaction zone in the liquid phase, any liquid monomer reactant that enters the reaction zone is rapidly vaporized so that all monomer reactants are in the vapour phase when they partake in the polymerization reaction. Additionally, the process is characterized thereby that no liquid component is present in the reaction zone while the reaction is in progress. By 'liquid component' is meant any component, whether capable of reacting with the monomer reactants or not, which is in liquid form at the reaction conditions prevailing in the reaction zone and which would remain in liquid form if introduced into the reaction zone. The liquid component does thus not include the monomer reactants, which can be introduced into the reaction zone in partly liquefied form as hereinbefore described, but which vaporize rapidly on entering the reaction zone. The liquid component also does not include the resultant propylene/1-pentene polymer, which can be in liquid form at the reaction conditions prevailing in the reaction zone. The liquid component also does not include any liquids present as part of the catalyst system, such as alkyl aluminium and stereoregulators, which remain liquid in the reaction zone but are present therein in very small or negligible amounts only, typically less than 0.5% (based on the total reaction zone content). The catalyst system also may contain a carrier such as heptane, but these carriers also rapidly vaporize on entering the reaction zone.

It will be appreciated that while the propylene/1-pentene polymer will normally be a copolymer of propylene and 1-pentene only, if may also, if desired, contain minor proportions of other monomers, which will then also be introduced into the reaction zone as monomer reactants and will then also be in the vapour phase while the reaction is in progress.

The 1-pentene may be that obtained by an appropriate process. Thus, for example, it may be that obtained from a Fischer-Tropsch synthesis reaction, typically that obtained from the SASOL (trade mark) Fischer-Tropsch synthesis reaction process.

Any Ziegler-Natta catalyst or catalyst system for propylene polymerization in vapour phase can, at least in principle, be used. However, a catalyst system comprising a titanium based Ziegler-Natta catalyst and, as a cocatalyst, an organo-aluminium compound, is preferred.

Typical titanium components of the Ziegler-Natta catalyst are titanium trichloride and titanium tetrachloride, which may be carried on a support. Catalyst support and activation can be effected in known fashion. For the preparation of the titanium catalyst, halides or alcoholates of trivalent or tetravalent titanium can be used. In addition to the trivalent and tetravalent titanium compounds and the support or carrier, the catalyst can also contain electron donor compounds, eg mono or polyfunctional carboxyl acids, carboxyl anhydrides and esters, ketones, ethers, alcohols, lactones, or organic phosphorous or silicon organic compounds.

An example of a preferred titanium-based Ziegler-Natta catalyst is $TiCl_3.1/3AlCl_3.1/3(n$-propyl benzoate [NPB]), which is commercially available.

However, the Applicant has also surprisingly found that when particular methods of catalyst preparation are used, process advantages in each particular embodiment or aspect of the invention may be obtained, and consequently the range of propylene/1-pentene polymers produced can be extended considerably.

Thus, the titanium-based Ziegler-Natta catalyst may be that obtained by contacting an activated magnesium chloride with titanium tetrachloride in the presence of a suitable electron donor.

Thus, the activated magnesium chloride is the support of the catalyst. The magnesium chloride may be used in the form of anhydrous magnesium chloride, providing that the anhydrization thereof is effected in such a manner that no anhydrization agent remains in the anhydrized magnesium chloride which is then further used to prepare the catalyst. In another embodiment of the catalyst preparation, the magnesium chloride may, however, have a water content between 0.02 mole of water/1 mole of magnesium chloride and 2 mole of water per 1 mole of magnesium chloride. Most preferably, the water content of magnesium chloride is in one particular case, 1.5% and, in a second particular case, 5%.

The anhydrous magnesium chloride is preferably activated prior to contacting or loading it with the titanium tetrachloride.

The activation of the anhydrous magnesium chloride may be performed under inert conditions, ie in a substantially oxygen and water free atmosphere and in the absence or in the presence of an inert saturated hydrocarbon liquid. Preferred inert saturated hydrocarbon liquids are aliphatic or cyclo-aliphatic liquid hydrocarbons, and the most preferred are hexane and heptane.

The magnesium chloride or support activation may be performed in two steps $(a_1)$ and $(a_2)$.

In step $(a_1)$, an ether may be added under inert conditions to a suspension of the magnesium chloride in the inert hydrocarbon liquid or to a powder form of magnesium chloride. The ether may be selected from linear ethers having a total number of carbon atoms between 8 and 16. The most preferred ethers are: di-butyl ether and di-pentyl ether. The molar ratio of the anhydrous magnesium chloride to the ether may be between 0.3:1 and 3:1, with the preferred molar ratio being 1:1 to 2.5:1. The resultant mixture or suspension may be stirred for a period of 10 minutes to 24 hours at room temperature. The preferred stirring time is 1 to 12 hours. The temperature for preparing the partially activated magnesium chloride may be 40° C. to 140° C. A partially activated magnesium chloride is thus obtained.

In the second step $(a_2)$ an alkyl aluminium compound may be added, preferably in dropwise fashion, to the partially activated magnesium chloride. Typical alkyl aluminium compounds which can be used are those expressed by the formula $AlR_mX_{3-m}$ wherein R is an alkyl radical or radical component of 1 to 10 carbon atoms, X is a halogen atom, and m is a number such that $0<m\leq3$. It was surprisingly found that in a particular copolymerization of propylene with 1-pentene, two particular cases of the alkyl aluminium can lead to the formation of two particular families of catalyst which, when used in the copolymerization of propylene with 1-pentene have different behaviours. Thus, in one version, the alkyl aluminium is completely free of chlorine while in the other version, it contains chlorine. Specific examples of suitable alkyl aluminium compounds of the first version which can be used are: tri-butyl aluminium, tri-isobutyl aluminium, tri-hexyl aluminium and tri-octyl aluminium. Preferred organo-aluminium compounds are tripropyl aluminium and tri-ethyl aluminium. A preferred example of the second version or class is diethylaluminium chloride. The molar ratio of the alkyl aluminium compound to the anhydrous magnesium chloride may be between 1:1 and 25:1. The preferred molar ratio of the alkyl aluminium compound to the anhydrous magnesium chloride is 4:1 to 5:1. The amount of the aluminium alkyl added to the partially activated magnesium chloride may comply with the equation:

$$A>B+C+D$$

where A represents the total moles of aluminium alkyl, B represents the moles of magnesium chloride, C represents the total moles of ether, and D represents the total moles of water (as the sum of the total water present in the magnesium chloride and any traces of water in the solvent).

The activated support is further washed with a saturated hydrocarbon liquid until none of the initially introduced ether is present.

The loading of the activated magnesium chloride or support with the titanium tetrachloride may be performed in three steps $(b_1)$ $(b_2)$ and $(b_3)$.

In the first step $(b_1)$, to the support, after thorough washing thereof with hexane, may be added an electron donor under stirring. The electron donors may be selected from the class of electron donors with labile hydrogen and from the class of electron donors without labile hydrogen. Preferred electron donors with labile hydrogen are selected from the class of alcohols, while preferred electron donors without labile hydrogen are selected from the class of organic esters. The electron donors with or without labile hydrogen may be added separately. However, they are preferably added simultaneously, either separately in the same preparation step or as a multicomponent mixture. Each alcohol may be selected from the alcohol range having 2 to 8 carbon atoms. Each ester may be selected from the class of organic ester derived from and aromatic acid, diacid or an aromatic anhydride. The Applicant has surprisingly found that different performances of the catalyst are obtained in a particular embodiment or aspect of this invention if particular esters are used in this step of the catalyst preparation, Thus preferred esters are esters derived from benzoic acid, phthalic acid and trimellitic anhydride.

In one version of this embodiment of the invention, one ester may be used. In another version of this embodiment of the invention a mixture of esters may be used. In yet another version of this embodiment of the invention, a mixture of an ester and an alcohol may be used. In a more particular case of this version of the invention, the alcohol may have the same number of carbon atoms as one or both alcohols used in the preparation of the aromatic dibasic acid ester. In an even more particular case a tricomponent mixture may be used. The three component mixture may comprise three esters, or two esters and one alcohol, or two alcohols and one ester, or three alcohols.

The molar ratio of the ester, or of a mixture thereof with another ester or with an alcohol, to the initial magnesium chloride used may be between 0.05:1 and 5:1.

The molar ratio between the two esters, or between the ester and the alcohol in a mixture of the ester with the alcohol, in a dicomponent mixture, can be 100:1 to 1:100; however, the preferred molar ratio is 1:1.

The molar ratio of the components of a tri-component mixture can vary widely, but preferably is about 1:1:1.

The stirring time may be between 1 min and 10 hours, preferably about 3 hours.

The temperature range can be between 0° C. and the lowest boiling point of the any one of the ester or alcohols from the multicomponent mixture or the solvent used in this step of the catalyst preparation.

In the second step ($b_2$), $TiCl_4$ may be added to the support/alcohol mixture, the mixture or slurry stirred under reflux and finally left to cool, eg for about 24 hours. The catalyst obtained may be thoroughly washed, eg with hexane.

The molar ratio of $TiCl_4$ employed in this step to the initial magnesium chloride may be from about 2:1 to about 20:1, preferably about 10:1.

In the third step ($b_3$) an ester is added. The Applicant has found that there are two versions of step ($b_3$), both leading surprisingly to catalysts with different performances:

i) The ester or ester mixture is the same ester or ester mixture used in step ($b_1$)

ii) The ester or ester mixture are different from the ester used in step ($b_1$)

The Applicant surprisingly found that by using more particular ways of activating the support, different and advantageous process performances can be obtained, when used in the different embodiments and aspects of this invention.

Thus, in another version of this embodiment of the invention, after the step of adding an ether to the partially anhydrized magnesium chloride as hereinbefore described, an alcohol may be added. The alcohol may be selected from the range of alcohols having between two and 8 carbon atoms. The preferred amount of alcohol added in this step may be between 0.5:1 and 2:1 of the ether added and most preferred the same as the amount as ether added. The excess solvent from the resultant solution may be removed under reduced pressure until the solution is saturated such that, when followed by slow cooling, the partially activated support will crystallize, whereafter a severe washing with a saturated hydrocarbon liquid follows.

The Applicant also surprisingly found that two very different families of catalysts may be obtained when two particular ways of further treating the support are used, and that these may lead to different and advantageous process performances when used in the different embodiments and aspects of this invention.

Thus, in one aspect of this embodiment of the invention, the support activated as hereinbefore described, is treated with an alkyl aluminium as also hereinbefore described followed by steps $b_1$, $b_2$ and $b_3$ as hereinbefore described. In this case the total aluminium alkyl should comply with the following equation:

$$A > B + C + D + E$$

where A represents the total moles of aluminium alkyl, B represents the moles of magnesium chloride, C represents the total moles of ether, D represents the total moles of water and E represents the total moles of alcohol.

In another version of this embodiment of the invention, the support activated as hereinbefore described is not treated with the alkyl aluminium, but instead thoroughly washed with an ether before the preparation is followed by the steps $b_1$, $b_2$ and $b_3$ as hereinbefore described. The ether may be the same ether as the ether used in the first step of magnesium chloride activation. However, after adding the alcohol, the excess solvent from the resultant solution may be removed under reduced pressure as hereinbefore described, until the solution is saturated, such that, when followed by slow cooling the partially activated support will crystallize. Thereafter two washing steps follow. In a first washing step, the same ether is used as that employed in the activation as hereinbefore described. In the second working step a saturated hydrocarbon is used.

The Applicant also surprisingly found that a very different family of catalysts may be obtained when a particular way of adding the titanium chloride is used, and which may lead to different and advantageous process performances when used in the different embodiments and version of this invention.

Thus, in one version of this embodiment of the invention, the order of loading the titanium is by adding the titanium to the activated support as in step $b_2$ followed by adding the electron donor as in step $b_1$ and followed by adding again the titanium compound as in step $b_2$.

The cocatalyst employed in the polymerization may, as stated, be an organo aluminium compound. Typical organoaluminium compounds which can be used are compounds expressed by the formula $AlR_mX_{3-m}$ wherein R is a hydrocarbon component of 1 to 15 carbon atoms, X is a halogen atom, and m is a number represented by $0<m\leq3$. Specific examples of suitable organo aluminium compounds which can be used are: a trialkyl aluminium, a trialkenyl aluminium, a partially halogenated alkyl aluminium, an alkyl aluminium sesquihalide, an alkyl aluminium dihalide. Preferred organo aluminium compounds are alkyl aluminium compounds, and the most preferred is triethylaluminium. The atomic ratio of aluminium to titanium in the catalyst system may be between 0.1:1 and 500:1, preferably between 1:1 and 100:1.

The Applicant has surprisingly discovered that very large ranges of propylene/1-pentene copolymers and different performances of the process in each particular embodiment are obtained when external stereoregulators are used during the copolymerization according to this invention. Any stereoregulator for propylene polymerization can, in principle, be used. However the most preferred stereoregulators are silanes and modified silanes. Examples of preferred silanes are: di-iso-propyl dimethoxy silane, diphenyl dichloro silane, methyl trimethoxy silane, dimethyl-diethoxy silane, chloro trimethyl silane and phenyl triethoxy silane.

The Applicant has also surprisingly found that different methods of further conditioning the catalyst lead to particular processes which yield different copolymers. Two particular catalyst preparation methods have been found to be most suitable for copolymerization of propylene with 1-pentene according to this invention, viz a particular prepolymerized catalyst and a particular polymer diluted catalyst.

Thus, in one embodiment the invention, a prepolymerized Ziegler-Natta catalyst or catalyst system may be used.

For the prepolymerization of the Ziegler-Natta catalyst or catalyst system, alpha olefins having a total carbon number between 2 and 20 may be used. Propylene is an example of such an alpha olefin. The inventors have surprisingly found that it is most preferable to use a mixture of propylene with 1-pentene to perform the prepolymerization of the Ziegler-Natta catalyst. It is even more preferred to use a mixture of propylene and 1-pentene in a mass proportion between 99.7:0.3 and 85:15.

Thus, in one version of this embodiment of the invention, the Ziegler-Natta catalyst may be prepolymerized with propylene.

The prepolymerization may be performed in a slurry phase comprising a solid particulate Ziegler-Natta catalyst slurried in an inert highly purified liquid hydrocarbon carrier. Linear or branched aliphatic liquid hydrocarbons can be used as the carrier liquid for the prepolymerization. The preferred carrier liquids have 6–7 carbon atoms. The most preferred carrier liquid is isohexane.

The concentration of the catalyst in the slurry may be 50–10000 mg of catalyst per 100 g of solvent. Preferably, the concentration may be 600–6000 mg of catalyst per 100 g of solvent. The most preferred concentration is 2000–4000 mg of catalyst or catalyst system per 100 g of solvent.

The Ziegler-Natta catalyst may be prepolymerized in the presence of the cocatalyst, ie the organo aluminium compound. Typical organo aluminium compounds which can be used in combination with the titanium based catalyst are, as mentioned above, compounds expressed by the formula $AlR_mX_{3-m}$ wherein R is hydrogen or a hydrocarbon residue of 1–15 carbon atoms, X is a halogen atom or alkoxy group of 1–15 carbon atoms, and m is an integer represented by $0<m\leq3$. Preferred organo aluminium compounds are then a trialkyl aluminium, an alkyl aluminium sesquihalide or an alkyl aluminium halide. The most preferred organo aluminium is triethyl aluminium.

The ratio of the Ziegler-Natta catalyst to the triethyl aluminium may be 1000 mg catalyst per 0.1 to 100 mmol triethyl aluminium; preferably 1000 mg catalyst per 1 to 10 mmol triethyl aluminium; most preferably 1000 mg catalyst per 3 to 5 mmol triethyl aluminium.

The prepolymerization may be performed in a closed vessel after thorough purging with nitrogen, by continuously supplying propylene to the vessel containing the catalyst/triethyl aluminium slurry. The amount of propylene supplied may be regulated to obtain a ratio of 1 to 300 g propylene/g catalyst, preferably 3 to 5 g propylene/g catalyst. The reaction temperature may be between 0° C. to 80° C., preferably room temperature.

In another version of this embodiment of the invention, the Ziegler-Natta catalyst may be prepolymerized with a mixture of propylene and 1-pentene in a mass proportion between 99.7:0.3 and 85:15, using the same prepolymerization conditions as described above for the prepolymerization with propylene.

The preferred catalyst system thus contains the prepolymerized catalyst and triethyl aluminium as cocatalyst.

In another embodiment of the invention, a polymer diluted Ziegler-Natta catalyst or catalyst system may be used.

Any polymer inactive to the catalyst may be used. An example of such a polymer is a propylene polymer. A preferred polymer is a copolymer of propylene with 1-pentene, while the most preferred polymer is a propylene/1-pentene copolymer with a 1-pentene content between 0.1% and 10% by weight.

The polymer diluted catalyst may be prepared by mixing the catalyst with the polymer in powder form. The mixing may involve mechanically stirring the catalyst and the polymer powder. Other known methods of stirring can also be used. The catalyst may be added to the polymer powder in a powder form or in a slurry form. However, the inventors have found that the best results are obtained when the polymer is added to a suspension of the catalyst, in powder form, in an inert liquid hydrocarbon, the resultant slurry mixed, and the solvent thereafter evaporated to obtain the polymer diluted catalyst in powder form.

In one version of this embodiment of the invention, the polymer diluted catalyst slurry may be directly supplied to the gas phase polymerization zone provided that the temperature in the reaction zone allow rapid vaporization of the limited amount of the carrier liquid in the polymer diluted catalyst.

A cocatalyst may be added to the polymer powder support prior to the addition of the catalyst thereto, or the co-catalyst may be added to the catalyst prior to the addition thereto of the polymer powder support. The co-catalyst employed may be an organo aluminium compound. As mentioned hereinbefore, typical organo-aluminium compounds which can be used are those compounds expressed by the formula $AlR_mX_{3-m}$ wherein R is a hydrocarbon component of 1 to 15 carbon atoms, X is a halogen atom, and m is a number represented by $0<m\leq3$. Specific examples of suitable organo aluminium compounds which can be used are: a trialkyl aluminium, a trialkenyl aluminium, a partially halogenated alkyl aluminium, an alkyl aluminium sesquihalide, and an alkyl aluminium dihalide. Preferred organo aluminium compounds are alkyl aluminium compounds, and the most preferred is triethyl aluminium. The atomic ratio of aluminium to titanium in the catalyst system may be between 0.1:1 and 10000:1, preferably between 1:1 and 5000:1.

The mixing of the polymer powder with the catalyst as hereinbefore described in the presence or absence of the cocatalyst may preferably be performed at a temperature between 10° C. and 40° C., more preferably at ambient temperature.

Thus, according to a second aspect of the invention, there is provided a process for producing a propylene/1-pentene polymer, which process comprises reacting propylene, as a first monomer reactant, with 1-pentene, as a second monomer reactant, in a reaction zone, in the presence of a prepolymerized or polymer diluted Ziegler-Natta catalyst or catalyst system, to form the propylene/1-pentene polymer, with the reactants being in the vapour phase in the reaction zone while the reaction is in progress, and with no liquid component being present in the reaction zone while the reaction is in progress.

The prepolymerization and polymer diluted Ziegler-Natta catalyst may be as hereinbefore described.

The Applicant has discovered that by introducing the monomers into the reaction zone in different fashions, the copolymer properties can be changed and a large variety of copolymers with different application properties can be obtained. According to this invention random propylene/1-pentene copolymers or random block propylene/1-pentene copolymer may be produced.

All the 1-pentene may be introduced into the reaction zone at the start of the reaction.

Thus, according to a third aspect of the invention, there is provided a process for producing a propylene/1-pentene polymer, which process comprises reacting, for a reaction period, propylene, as a first monomer reactant, with 1-pentene, as a second monomer reactant, in vapour phase in a reaction zone in the presence of a Ziegler-Natta catalyst or catalyst system, to form the propylene/1-pentene polymer, with all the 1-pentene being introduced into the reaction zone at the beginning of the reaction period, with the ratio of propylene to 1-pentene in the reaction zone being varied continuously over the reaction period, with all the reactants being in the vapour phase in the reaction zone while the reaction is in progress, and with no liquid component being present in the reaction zone while the reaction is in progress.

In one embodiment, the propylene may be introduced continuously into the reaction zone over the duration of the reaction at a constant pressure, with the variation in the ratio of propylene to 1-pentene being realized by the continuous decrease in the ratio of 1-pentene to propylene due to the consumption of 1-pentene during the reaction and by the different ractivities of propylene and 1-pentene under the same reaction conditions.

In another embodiment, the propylene may be introduced continuously into the reaction zone over the duration of the reaction at a constant flow rate. The variation in the rate of propylene to 1-pentene is realized by the continuous decrease in the ratio of 1-pentene to propylene due to the consumption of 1-pentene during the reaction and due to different reactivities of propylene and 1-pentene under different reaction conditions.

However, instead, the 1-pentene may be introduced intermittently into the reaction zone.

Thus, according to a fourth aspect of the invention, there is provided a process for producing a propylene/1-pentene polymer which process comprises reacting, for a reaction period, propylene as a first monomer reactant, with 1-pentene, as a second monomer reactant, in vapour phase in a reaction zone in the presence of a Ziegler-Natta catalyst or catalyst system, by introducing the 1-pentene intermittently into the reaction zone and continuously modifying the ratio of propylene to 1-pentene in the reaction zone over the reaction period, to form the propylene/1-pentene polymer, with all the reactants being in the vapour phase in the reaction zone while the reaction is in progress, and with no liquid component being present in the eaction zone while the reaction is in progress.

In one embodiment, the same amounts of the 1-pentene may be introduced intermittently into the reaction zone, with the propylene being introduced continuously into the reaction zone during the reaction, at a constant pressure or constant flow. The variation in the ratio of propylene to 1-pentene may be realized by the intermittent decrease in the ratio of 1-pentene/propylene due to the consumption of 1-pentene during the reaction between the 1-pentene additions and the different reactivities of propylene and 1-pentene under the same reaction conditions.

In another embodiment, differing amounts of the 1-pentene may be introduced intermittently into the reaction zone, with the propylene being introduced continuously into the reaction zone during the reaction, at a constant pressure or constant flow. The variation in the ratio of propylene to 1-pentene is realized by the intermittent decrease in the ratio of 1-pentene/propylene due to the consumption of 1-pentene in the reaction zone between the 1-pentene additions and this decrease being different according to the amount intermittently introduced, and also by the different reactivities of propylene and 1-pentene under the same reaction conditions.

In yet another embodiment, however, both the propylene and 1-pentene may be introduced continuously into the reaction zone.

Thus, according to a fifth aspect of the invention, there is provided a process for preparing a propylene/1-pentene polymer which process comprises reacting, for a reaction period, propylene, as a first monomer reactant, with 1-pentene, as a second monomer reactant, in vapour phase in a reaction zone in the presence of a Ziegler-Natta catalyst or catalyst system by continuously introducing both propylene and 1-pentene into the reaction zone over the reaction period, to form the propylene/1-pentene polymer, with all the reactants being in the vapour phase in the reaction zone while the reaction is in progress, and with no liquid component being present in the reaction zone while the reaction is in progress.

In one embodiment of this aspect of the invention, both the propylene and the 1-pentene may be introduced continuously into the reaction zone at a constant pressure.

In another embodiment of this aspect of the invention, both the propylene and the 1-pentene may be introduced continuously into the reaction zone at a constant flow rate.

In yet another embodiment of this aspect of the invention, both the propylene and the 1-pentene may be introduced continuously into the reaction zone at a constant pressure and at a constant flow.

The reaction mixture containing the polymer may be continuously removed from the reaction zone and supplied to a separation unit where the copolymer in powder form is separated from the unreacted monomers. The operating parameters of the separating unit are selected such that substantially no unreacted propylene and/or a pentene are liquified. Such separation units are known in the art. The unreacted monomers may be recycled to the reactor with or without complete separation.

In one particular case of this embodiment of this aspect of the invention, a limited amount of propylene and 1-pentene may be partially liquified in a cooling unit and returned to the reaction zone either preheated or in the liquid form in separate line or through a monomer feed line. The propylene/1-pentene gas mixture which is not liquified in this unit is further supplied to a separation unit for propylene and 1-pentene separation.

In another particular case of this embodiment of this aspect of the invention the whole amount of propylene/1-pentene gas mixture may further be supplied to a separation unit for propylene and 1-pentene separation. Such separation units are known in the art.

In a still further embodiment of the invention, in a first step, at least some of the propylene may be homopolymerized in the reaction zone whereafter, in a second step, the 1-pentene, or the 1-pentene and the balance of the propylene, are added to the reaction zone.

Thus, according to a sixth aspect of the invention, there is provided a process for preparing a propylene/1-pentene polymer which process comprises, in a first step, homopolymerizing propylene in a reaction zone, and thereafter, in a second step, adding 1-pentene, or propylene and 1-pentene, to the reaction zone, with both steps being effected in vapour phase in the presence of a Ziegler-Natta catalyst or catalyst system, to form the propylene/1-pentene polymer, with all the reactants being in the vapour phase in the reaction zone while the reaction is in progress, and with no liquid component being present in the reaction zone while the reaction is in progress.

In one embodiment of this aspect of the invention, an amount of propylene may first be homopolymerized in the reaction zone in the first step, with the second step comprising reacting the balance of the propylene with 1-pentene by introducing the balance of the 1-pentene at the beginning of the second step and by continuously introducing the propylene into the reaction zone under constant pressure.

In another embodiment of this aspect of the invention, an amount of propylene may first be homopolymerized in the reaction zone in the first step, with the second step comprising reacting the balance of the propylene with 1-pentene by introducing the balance of the 1-pentene at the beginning of the second step and by continuously introducing the propylene into the reaction zone under constant flow.

In yet another embodiment of this aspect of the invention, an amount of propylene may first be homopolymerized in the reaction zone in the first step, with the second step comprising reacting the balance of the propylene with 1-pentene by introducing the same amounts of the balance of the 1-pentene intermittently during the second step and by continuously introducing the propylene into the reaction zone under constant flow or constant pressure.

In a still further embodiment of this aspect of the invention, an amount of propylene may first be homopolymerized in the reaction zone in the first step, with the second step comprising reacting the balance of the propylene with 1-pentene by introducing different amounts of the balance of the 1-pentene intermittently during the second step and by continuously introducing the propylene into the reaction zone under constant flow or constant pressure.

In yet a further embodiment of this aspect of the invention, an amount of propylene may first be homopolymerized in the reaction zone in the first step, with the second step comprising reacting the balance of the propylene with 1-pentene by introducing both the balance of the propylene and the 1-pentene continuously into the reaction zone at constant pressure or constant flow.

A very large range of propylene/1-pentene copolymers can be produced in accordance with each embodiment or aspect of this invention. The invention thus extends also to polymers when produced by the process according to this invention.

The invention will now be described by way of the following non-limiting examples.

EXAMPLE 1

Catalyst A Preparation

Partially anhydrized magnesium chloride (20 g) was stirred in 100-ml dibutyl ether at 80° C. for 30 minutes. 200-ml Ethanol was added and the excess solvent from the resulting solution was removed under reduced pressure until crystallization occurred. This fine crystalline material was washed three times with 50-ml dibutyl ether followed by three washes with 100-ml heptane. This activated support was then dried under reduced pressure. To the activated support thus formed was added 150-ml TiCl$_4$ in 100-ml heptane and heated to 80° C. and stirred for 60 minutes. This mixture was filtered while hot and washed with boiling heptane until no TiCl$_4$ could be detected in the washings. To the washed titanium containing compound was added 6 g (1:0.1 Mg:Phthalate) of di-iso-butyl phthalate in 100-ml heptane, heated to 80° C. and stirred for 60 minutes. It was then filtered while hot and washed five times with boiling heptane. To this washed compound was added 150-ml TiCl$_4$ in 100-ml heptane, heated to 80° C. and stirred for 60 minutes. The formed catalyst was filtered while hot and washed with boiling heptane until no TiCl$_4$ could be detected in the washings and then dried.

Polymerization

A 20-liter gas phase autoclave equipped with heating, cooling and stirring facilities was purged with nitrogen and heated to 85° C. 20-ml of a 10% solution of tripropyl aluminum in heptane was introduced while the catalyst system comprising 20 ml of a 10% solution of triethyl aluminum in heptane, 2-ml of a 10% solution of di-iso-propyl dimethoxy silane in heptane and 1 g of catalyst A was prereacted at 25° C. for 5 minutes. This catalyst slurry was introduced into the reactor, followed by 30 mg hydrogen and the reactor pressurized to 3 bar with nitrogen. The polymerization was started by increasing the reactor pressure to and keeping it constant at 6 bar with propylene and simultaneously starting a constant flow of 1-pentene at a rate of 10 g/min. After two minutes the flow of 1-pentene was stopped and the reaction continued for another 88 minutes. The polymer in the form of a powder was removed from the reactor, washed with iso propanol and acetone, filtered and dried for 12 hours in a vacuum oven at 80° C. The copolymer obtained had the following properties:

1-Pentene content of 6.2 mass %

Melt flow index of 7 g/10 min. as measured according to ASTM D 1238

Tensile strength at yield of 17.6 MPa as measured according to ASTM D 638M

Elongation at yield of 46.5% as measured according to ASTM 638M

Modulus of 605 MPa as measured according to ASTM 638M

Notched Izod impact strength of 7.97 kJ/m$^2$ as measured according to ASTM 256

Hardness of 60 as measured according to ASTM D 2240.

EXAMPLE 2

A 20-liter gas phase autoclave equipped with heating, cooling and stirring facilities was purged with nitrogen and heated to 85° C. 20-ml of a 10% solution of dibutyl aluminum chloride in heptane was introduced while the catalyst system comprising 25ml of a 10% solution of triethyl aluminum in heptane, 5-ml of a 10% solution of di-iso-propyl dimethoxy silane in heptane and 1 g of catalyst A was prereacted at 25° C. for 5 minutes. This catalyst slurry was introduced into the reactor, followed by 50 mg hydrogen and the polymerization started by increasing the reactor pressure to and keeping it constant at 6 bar with propylene and simultaneously starting a constant flow of 1-pentene at a rate of 1 g/min. After 20 minutes the flow of 1-pentene was stopped and the reaction continued for another 70 minutes. The polymer in the form of a powder was removed from the reactor, washed with iso propanol and acetone, filtered and dried for 12 hours in a vacuum oven at 80° C. The copolymer obtained had the following properties:

1-Pentene content of 3.4 mass %

Melt flow index of 35 g/10 min. as measured according to ASTM D 1238

Tensile strength at yield of 27.9 MPa as measured according to ASTM D 638M

Elongation at yield of 37% as measured according to ASTM 638M

Modulus of 1091 MPa as measured according to ASTM 638M

Notched Izod impact strength of 2.29 kJ/m$^2$ as measured according to ASTM 256

Hardness of 70 as measured according to ASTM D 2240.

EXAMPLE 3

Catalyst B Preparation

Partially anhydrized magnesium chloride (20 g) was stirred in 30-ml ethyl benzoate at 80° C. for 60 minutes. 200-ml Ethanol was added and the excess solvent from the resulting solution was removed under reduced pressure until the solution was saturated. It was then cooled slowly and allowed to crystallize. This crystalline material was washed three times with 100-ml heptane and then reacted with an excess of a 10% solution of diethyl aluminium chloride in heptane at 50° C. and again washed with heptane until no more DEAC could be detected in the washings. To the washed compound was added 12 g (1:0.1 Mg:Phthalate) of di-n-butyl phthalate in 100-ml heptane, heated to 50° C. and ground for 60 minutes. To this compound was added 150-ml $TiCl_4$ in 100-ml heptane, heated to 50° C. and stirred for 60 minutes. It was then filtered while hot and washed with boiling heptane until no $TiCl_4$ could be detected in the washings. To the washed titanium containing compound was added 4 g of di-n-butyl phthalate in 100-ml heptane, heated to 50° C. and stirred for 30 minutes. It was then filtered while hot and washed five times with boiling heptane. To this compound was added 100-ml $TiCl_4$ in 100-ml heptane, heated to 50° C. and stirred for 16 hours. It was then filtered while hot and washed with boiling heptane until no $TiCl_4$ could be detected in the washings.

Polymerization

A 20-liter gas phase autoclave equipped with heating, cooling and stirring facilities was purged with nitrogen and heated to 85° C. 20-ml of a 10% solution of triethyl aluminum in heptane was introduced while the catalyst system comprising 20 ml of a 10% solution of triethyl aluminum in heptane, 5-ml of a 10% solution of di-iso-propyl dimethoxy silane in heptane and 3 g of catalyst B was prereacted at 25° C. for 5 minutes. This catalyst slurry was introduced into the reactor, followed by 50 mg hydrogen and the polymerization started by increasing the reactor pressure to and keeping it constant at 9 bar with propylene and simultaneously starting a constant flow of 1-pentene at a rate of 1.5 g/min. After 13 minutes the flow of 1-pentene was stopped and the reaction continued for another 107 minutes. The polymer in the form of a powder was removed from the reactor, washed with iso propanol and acetone, filtered and dried for 12 hours in a vacuum oven at 80° C. The copolymer obtained had the following properties:

1-Pentene content of 0.6 mass %

Melt flow index of 59 g/10 min. as measured according to ASTM D 1238

Elongation at yield of 57.6% as measured according to ASTM 638M

Modulus of 361 MPa as measured according to ASTM 638M

Notched Izod impact strength of 10.57 $kJ/m^2$ as measured according to ASTM 256

Hardness of 53 as measured according to ASTM D 2240.

EXAMPLE 4

Catalyst C Preparation

Partially anhydrized magnesium chloride (20 g) was stirred in 30-ml dipentyl ether at 80° C. for 60 minutes. 200-ml Ethanol was added and the excess solvent from the resulting solution was removed under reduced pressure until the solution was saturated. It was then cooled slowly and allowed to crystallize. This crystalline material was washed three times with 100-ml heptane and then reacted with an excess of a 10% solution of triethyl aluminium in heptane at 50° C. and again washed with heptane until no more TEA could be detected in the washings. To the washed compound was added 12 g (1:0.1 Mg:Phthalate) of di-n-butyl phthalate in 100-ml heptane, heated to 50° C. and ground for 60 minutes. To this compound was added 150-ml $TiCl_4$ in 100-ml heptane, heated to 50° C. and stirred for 60 minutes. It was then filtered while hot and washed with boiling heptane until no $TiCl_4$ could be detected in the washings. To the washed titanium containing compound was added 4 g of di-n-butyl phthalate in 100-ml heptane, heated to 50° C. and stirred for 30 minutes. It was then filtered while hot and washed five times with boiling heptane. To this compound was added 100-ml $TiCl_4$ in 100-ml heptane, heated to 50° C. and stirred for 16 hours. It was then filtered while hot and washed with boiling heptane until no $TiCl_4$ could be detected in the washings.

Polymerization

A 20-liter gas phase autoclave equipped with heating, cooling and stirring facilities was purged with nitrogen and heated to 85° C. 20-ml of a 10% solution of triethyl aluminum in heptane was introduced while the catalyst system comprising 20 ml of a 10% solution of triethyl aluminum in heptane, 5-ml of a 10% solution of di-iso-propyl dimethoxy silane in heptane and 2.5 g of catalyst C was prereacted at 25° C. for 5 minutes. This catalyst slurry was introduced into the reactor, followed by 30 mg hydrogen and the polymerization started by increasing the reactor pressure to and keeping it constant at 9 bar with propylene and simultaneously starting a constant flow of 1-pentene at a rate of 1 g/min. After 24 minutes the flow of 1-pentene was stopped and the reaction continued for 10 minutes. The flow of 1-pentene was again started at 1.5 g/min and continued for 24 minutes. After this period the flow of 1-pentene was stopped and the reaction continued for another 122 minutes. The polymer in the form of a powder was removed from the reactor, washed with iso propanol and acetone, filtered and dried for 12 hours in a vacuum oven at 80° C. The copolymer obtained had the following properties:

1-Pentene content of 3.2 mass %

Melt flow index of 45 g/10 min. as measured according to ASTM D 1238

Tensile strength at yield of 12.5 MPa as measured according to ASTM D 638M

Modulus of 140 MPa as measured according to ASTM 638M

Notched Izod impact strength of 41.75 $kJ/m^2$ (no break) as measured according to ASTM 256.

EXAMPLE 5

A 20-liter gas phase autoclave equipped with heating, cooling and stirring facilities was purged with nitrogen and heated to 85° C. 20-ml of a 10% solution of triethyl aluminum in heptane was introduced while the catalyst system comprising 20 ml of a 10% solution of triethyl aluminum in heptane, 5-ml of a 10% solution of di-iso-propyl dimethoxy silane in heptane and 2.5 g of catalyst A was prereacted at 25° C. for 5 minutes. This catalyst slurry was introduced into the reactor and the polymerization started by increasing the reactor pressure to and keeping it constant at 9 bar with propylene and simultaneously starting a constant flow of 1-pentene at a rate of 2.5 g/min. After 5 minutes the flow of 1-pentene was stopped and the reaction continued for 10 minutes. The flow of 1-pentene was again started at 2.5 g/min and continued for 10 minutes. After this period the flow of 1-pentene was stopped and the reaction continued for another 125 minutes. The polymer in the form of a powder was removed from the reactor, washed with iso propanol and acetone, filtered and dried for 12 hours in a vacuum oven at 80° C. The copolymer obtained had the following properties:

1-Pentene content of 2 mass %

Melt flow index of 3.2 g/10 min. as measured according to ASTM D 1238

Tensile strength at yield of 19.8 MPa as measured according to ASTM D 638M

Elongation at yield of 48% as measured according to ASTM 638M

Modulus of 660 MPa as measured according to ASTM 638M

Notched Izod impact strength of 9.7 kJ/m$^2$ as measured according to ASTM 256

Hardness of 64 as measured according to ASTM D 2240.

EXAMPLE 6

Catalyst D Preparation

Partially anhydrized magnesium chloride (20 g) was stirred in 100-ml dibutyl ether at 80° C. for 30 minutes. 200-ml Ethanol was added and the excess solvent from the resulting solution was removed under reduced pressure until crystallization occurred. This fine crystalline material was washed three times with 50-ml dibutyl ether followed by three washes with 100-ml heptane. This activated support was then dried under reduced pressure. To the activated support thus formed was added 150-ml TiCl$_4$ in 100-ml heptane and heated to 80° C. and stirred for 60 minutes. This mixture was filtered while hot and washed with boiling heptane until no TiCl$_4$ could be detected in the washings. To the washed titanium containing compound was added 6 g of a 1:1 mixture of di-iso-butyl phthalate and ethyl benzoate in 100-ml heptane, heated to 80° C. and stirred for 60 minutes. It was then filtered while hot and washed five times with boiling heptane. To this washed compound was added 150-ml TiCl$_4$ in 100-ml heptane, heated to 80° C. and stirred for 60 minutes. The formed catalyst was filtered while hot and washed with boiling heptane until no TiCl$_4$ could be detected in the washings and then dried.

Polymerization

A 20-liter gas phase autoclave equipped with heating, cooling and stirring facilities was purged with nitrogen and heated to 85° C. 20-ml of a 10% solution of triethyl aluminum in heptane was introduced while the catalyst system comprising 20 ml of a 10% solution of triethyl aluminum in heptane, 5-ml of a 10% solution of di-iso-propyl dimethoxy silane in heptane and 2.5 g of catalyst D was prereacted at 25° C. for 5 minutes. This catalyst slurry was introduced into the reactor and the polymerization started by increasing the reactor pressure to and keeping it constant at 9 bar with propylene and simultaneously starting a constant flow of 1-pentene at a rate of 1 g/min. After 60 minutes the flow of 1-pentene was stopped and the reaction continued for another 90 minutes. The polymer in the form of a powder was removed from the reactor, washed with iso propanol and acetone, filtered and dried for 12 hours in a vacuum oven at 80° C. The copolymer obtained had the following properties:

1-Pentene content of 4.2 mass %

Melt flow index of 6 g/10 min. as measured according to ASTM D 1238

Tensile strength at yield of 14.9 MPa as measured according to ASTM D 638M

Elongation at yield of 50% as measured according to ASTM 638M

Modulus of 485 MPa as measured according to ASTM 638M

Notched Izod impact strength of 47.5 kJ/m$^2$ (no break) as measured according to ASTM 256

Hardness of 58 as measured according to ASTM D 2240.

EXAMPLE 7

Catalyst E Preparation

Partially anhydrized magnesium chloride (20 g) was stirred in 30-ml dipentyl ether at 80° C. for 60 minutes. 200-ml Ethanol was added and the excess solvent from the resulting solution was removed under reduced pressure until the solution was saturated. It was then cooled slowly and allowed to crystallize. This crystalline material was washed three times with 100-ml heptane and then reacted with an excess of a 10% solution of triethyl aluminium in heptane at 50° C. and again washed with heptane until no more TEA could be detected in the washings. To the washed compound was added 12 g (1:0.1 Mg:Phthalate) of di-n-butyl phthalate in 100-ml heptane, heated to 50° C. and ground for 60 minutes. To this compound was added 150-ml TiCl$_4$ in 100-ml heptane, heated to 50° C. and stirred for 60 minutes. It was then filtered while hot and washed with boiling heptane until no TiCl$_4$ could be detected in the washings. To the washed titanium containing compound was added 4 g of ethyl benzoate in 100-ml heptane, heated to 50° C. and stirred for 30 minutes. It was then filtered while hot and washed five times with boiling heptane. To this compound was added 100-ml TiCl$_4$ in 100-ml heptane, heated to 50° C. and stirred for 16 hours. It was then filtered while hot and washed with boiling heptane until no TiCl$_4$ could be detected in the washings.

Polymerization

A 20-liter gas phase autoclave equipped with heating, cooling and stirring facilities was purged with nitrogen and heated to 85° C. 20-ml of a 10% solution of triethyl aluminum in heptane was introduced while the catalyst system comprising 20 ml of a 10% solution of triethyl aluminum in heptane, 5-ml of a 10% solution of di-iso-propyl dimethoxy silane in heptane and 2.5 g of catalyst E was prereacted at 25° C. for 5 minutes. This catalyst slurry was introduced into the reactor and the polymerization started by increasing the reactor pressure to and keeping it constant at 9 bar with propylene and simultaneously starting a constant flow of 1-pentene at a rate of 1.5 g/min. After 33 minutes the flow of 1-pentene was stopped and the reaction continued for another 117 minutes. The polymer in the form of a powder was removed from the reactor, washed with iso propanol and acetone, filtered and dried for 12 hours in a vacuum oven at 80° C. The copolymer obtained had the following properties:

1-Pentene content of 3.1 mass %

Melt flow index of 5 g/10 min. as measured according to ASTM D 1238

Tensile strength at yield of 17.2 MPa as measured according to ASTM D 638M

Elongation at yield of 55% as measured according to ASTM 638M

Modulus of 545 MPa as measured according to ASTM 638M

Notched Izod impact strength of 52 kJ/m$^2$ (no break) as measured according to ASTM 256

Hardness of 58 as measured according to ASTM D 2240.

EXAMPLE 8

Catalyst F Preparation

Partially anhydrized magnesium chloride (20 g) was stirred in 30-ml di-iso-butyl phthalate at 80° C. for 60 minutes. 200-ml Ethanol was added and the excess solvent from the resulting solution was removed under reduced pressure until the solution was saturated. It was then cooled slowly and allowed to crystallize. This crystalline material was washed three times with 100-ml heptane and then reacted with an excess of a 10% solution of triethyl aluminium in heptane at 50° C. and again washed with heptane until no more TEA could be detected in the washings. To the washed compound was added 12 g (1:0.1 Mg:Phthalate) of di-n-butyl phthalate in 100-ml heptane, heated to 50° C. and ground for 60 minutes. To this compound was added 150-ml $TiCl_4$ in 100-ml heptane, heated to 50° C. and stirred for 60 minutes. It was then filtered while hot and washed with boiling heptane until no $TiCl_4$ could be detected in the washings. To the washed titanium containing compound was added 4 g of di-n-butyl phthalate in 100-ml heptane, heated to 50° C. and stirred for 30 minutes. It was then filtered while hot and washed five times with boiling heptane. To this compound was added 100-ml $TiCl_4$ in 100-ml heptane, heated to 50° C. and stirred for 16 hours. It was then filtered while hot and washed with boiling heptane until no $TiCl_4$ could be detected in the washings.

Polymerization

A 20-liter gas phase autoclave equipped with heating, cooling and stirring facilities was purged with nitrogen and heated to 85° C. 20-ml of a 10% solution of triethyl aluminum in heptane was introduced while the catalyst system comprising 20 ml of a 10% solution of triethyl aluminum in heptane, 5-ml of a 10% solution of di-isopropyl dimethoxy silane in heptane and 2.5 g of catalyst F was prereacted at 25° C. for 5 minutes. This catalyst slurry was introduced into the reactor and the polymerization started by increasing the reactor pressure to and keeping it constant at 9 bar with propylene. After 60 minutes a constant flow of 1-pentene at a rate of 1 g/min. was started for 10 minutes. The 1-pentene flow was interrupted for 10 minutes and then again started at 1 g/min. for a further 10 minutes and then stopped and the reaction continued for another 120 minutes. The polymer in the form of a powder was removed from the reactor, washed with iso propanol and acetone, filtered and dried for 12 hours in a vacuum oven at 80° C. The copolymer obtained had the following properties:

- 1-Pentene content of 0.66 mass %
- Melt flow index of 3 g/10 min. as measured according to ASTM D 1238
- Tensile strength at yield of 23.5 MPa as measured according to ASTM D 638M
- Elongation at yield of 56% as measured according to ASTM 638M
- Modulus of 860 MPa as measured according to ASTM 638M
- Notched Izod impact strength of 4.8 kJ/m² as measured according to ASTM 256
- Hardness of 64 as measured according to ASTM D 2240.

EXAMPLE 9

A 20-liter gas phase autoclave equipped with heating, cooling and stirring facilities was purged with nitrogen and heated to 85° C. 20-ml of a 10% solution of triethyl aluminum in heptane was introduced while the catalyst system comprising 20 ml of a 10% solution of triethyl aluminum in heptane and 1.5 g of catalyst A was prereacted at 25° C. for 5 minutes. This catalyst slurry was introduced into the reactor and the polymerization started by increasing the reactor pressure to and keeping it constant at 9 bar with propylene. After 30 minutes a constant flow of 1-pentene at a rate of 1 g/min. was started for 10 minutes. The 1-pentene flow was interrupted for 10 minutes and then again started at 1 g/min. for a further 20 minutes and then stopped and the reaction continued for another 110 minutes. The polymer in the form of a powder was removed from the reactor, washed with iso propanol and acetone, filtered and dried for 12 hours in a vacuum oven at 80° C. The copolymer obtained had the following properties:

- 1-Pentene content of 3.9 mass %
- Melt flow index of 65 g/10 min. as measured according to ASTM D 1238
- Tensile strength at yield of 10.4 MPa as measured according to ASTM D 638M
- Elongation at yield of 56% as measured according to ASTM 638M
- Modulus of 305 MPa as measured according to ASTM 638M
- Notched Izod impact strength of 42.4 kJ/m² (no break) as measured according to ASTM 256
- Hardness of 44 as measured according to ASTM D 2240.

EXAMPLE 10

A 20-liter gas phase autoclave equipped with heating, cooling and stirring facilities was purged with nitrogen and heated to 85° C. 20-ml of a 10% solution of diethyl aluminum chloride in heptane was introduced while the catalyst system comprising 20 ml of a 10% solution of triethyl aluminum in heptane, 5-ml of a 10% solution of di-isopropyl dimethoxy silane and 2.5 g of catalyst A was prereacted at 25° C. for 5 minutes. This catalyst slurry was introduced into the reactor and the polymerization started by increasing the reactor pressure to and keeping it constant at 9 bar with propylene. After 60 minutes a constant flow of 1-pentene at a rate of 1 g/min. was started. The 1-pentene flow was stopped after 60 minutes and the reaction continued for another 30 minutes. The polymer in the form of a powder was removed from the reactor, washed with iso propanol and acetone, filtered and dried for 12 hours in a vacuum oven at 80° C. The copolymer obtained had the following properties:

- 1-Pentene content of 3.7 mass %
- Melt flow index of 6.6 g/10 min. as measured according to ASTM D 1238
- Tensile strength at yield of 16.5 MPa as measured according to ASTM D 638M
- Elongation at yield of 54% as measured according to ASTM 638M
- Modulus of 520 MPa as measured according to ASTM 638M
- Notched Izod impact strength of 19 kJ/m² as measured according to ASTM 256
- Hardness of 58 as measured according to ASTM D 2240.

EXAMPLE 11

Catalyst G Preparation

Partially anhydrized magnesium chloride (20 g) was ground in the presence of 100-ml dibutyl ether at 80° C. for 60 minutes and then washed three times with 100-ml heptane. It was then reacted with an excess of a 10% solution of triethyl aluminium in heptane at 50° C. and again washed with heptane until no more TEA could be detected in the washings. To this support was added 10-ml of a 1:1:1 molar ratio ethanol, butanol and pentanol mixture, stirred for 3 hours at 40° C. To the activated support thus formed was added 150-ml $TiCl_4$ in 100-ml heptane and heated to 80° C. and stirred for 60 minutes. This mixture was filtered while hot and washed with boiling heptane until no $TiCl_4$ could be detected in the washings. To the washed titanium containing compound was added 6 g (1:0.1 Mg:Phthalate) of di-isobutyl phthalate in 100-ml heptane, heated to 80° C. and stirred for 60 minutes. It was then filtered while hot and washed five times with boiling heptane. To this washed compound was added 150-ml $TiCl_4$ in 100-ml heptane, heated to 80° C. and stirred for 60 minutes. The formed catalyst was filtered while hot and washed with boiling heptane until no $TiCl_4$ could be detected in the washings and then dried.

A 20-liter gas phase autoclave equipped with heating, cooling and stirring facilities was purged with nitrogen and heated to 85° C. 20-ml of a 10% solution of tripropyl aluminum in heptane was introduced while the catalyst system comprising 20 ml of a 10% solution of triethyl aluminum in heptane, 5-ml of a 10% solution of di-isopropyl dimethoxy silane and 2.5 g of catalyst G was prereacted at 25° C. for 5 minutes. This catalyst slurry was introduced into the reactor, followed by 50 mg hydrogen and the reactor pressure increased to 3.5 bar with nitrogen. The polymerization was started by increasing the reactor pressure to and keeping it constant at 9 bar with propylene. After 60 minutes a constant flow of 1-pentene at a rate of 0.5 g/min. was started. The 1-pentene flow was stopped after 60 minutes and the reaction continued for another 30 minutes. The polymer in the form of a powder was removed from the reactor, washed with iso propanol and acetone, filtered and dried for 12 hours in a vacuum oven at 80° C. The copolymer obtained had the following properties:

1-Pentene content of 2.1 mass %

Melt flow index of 29 g/10 min. as measured according to ASTM D 1238

Tensile strength at yield of 28 MPa as measured according to ASTM D 638M

Elongation at yield of 37% as measured according to ASTM 638M

Modulus of 1090 MPa as measured according to ASTM 638M

Notched Izod impact strength of 2.9 $kJ/m^2$ as measured according to ASTM 256

Hardness of 68 as measured according to ASTM D 2240.

EXAMPLE 12

Catalyst H Preparation

Partially anhydrized magnesium chloride (20 g) was ground in the presence of 100-ml dibutyl ether at 80° C. for 60 minutes and then washed three times with 100-ml heptane. It was then reacted with an excess of a 10% solution of triethyl aluminium in heptane at 50° C. and again washed with heptane until no more TEA could be detected in the washings. To the washed compound was added 6 g (1:0.1 Mg:Phthalate) of di-n-butyl phthalate in 100-ml heptane, heated to 50° C. and ground for 60 minutes. To this compound was added 150-ml $TiCl_4$ in 100-ml heptane, heated to 50° C. and stirred for 60 minutes. It was then filtered while hot and washed with boiling heptane until no $TiCl_4$ could be detected in the washings. To the washed titanium containing compound was added 4 g of di-n-butyl phthalate in 100-ml heptane, heated to 50° C. and stirred for 30 minutes. It was then filtered while hot and washed five times with boiling heptane. To this compound was added 100-ml $TiCl_4$ in 100-ml heptane, heated to 50° C. and stirred for 16 hours, It was then filtered while hot and washed with boiling heptane until no $TiCl_4$ could be detected in the washings.

Polymerization

A 20-liter gas phase autoclave equipped with heating, cooling and stirring facilities was purged with nitrogen and heated to 85° C. 20-ml of a 10% solution of triethyl aluminum in heptane was introduced while the catalyst system comprising 20 ml of a 10% solution of triethyl aluminum in heptane, 5-ml of a 10% solution of di-isopropyl dimethoxy silane and 2.5 g of catalyst H was prereacted at 25° C. for 5 minutes. This catalyst slurry was introduced into the reactor, followed by 50 mg hydrogen and the reactor pressure increased to 2.5 bar with nitrogen. The polymerization was started by increasing the reactor pressure to and keeping it constant at 9 bar with propylene. After 30 minutes a constant flow of 1-pentene at a rate of 1 g/min. was started and reaction continued for 120 minutes. The polymer in the form of a powder was removed from the reactor, washed with iso propanol and acetone, filtered and dried for 12 hours in a vacuum oven at 80° C. The copolymer obtained had the following properties:

1-Pentene content of 2.5 mass %

Melt flow index of 29 g/10 min. as measured according to ASTM D 1238

Tensile strength at yield of 18.5 MPa as measured according to ASTM D 638M

Elongation at yield of 41.8% as measured according to ASTM 638M

Modulus of 695 MPa as measured according to ASTM 638M

Notched Izod impact strength of 3.9 $kJ/m^2$ (no break) as measured according to ASTM 256

Hardness of 61 as measured according to ASTM D 2240.

EXAMPLE 13

Catalyst I Preparation

To a 1-liter autoclave was added 50-ml of a 10% solution of triethyl aluminum in heptane, 5-ml of a 10% solution of di-iso-propyl dimethoxy silane in heptane and 2.5 g of catalyst A and reacted for 5 minutes at 75° C. Propylene and 1-pentene was fed to the reactor for 5 minutes at rates of 10 g/min. and 1 g/min. respectively and polymerization continued for 30 minutes to form a catalyst slurry. This slurry was filtered and dried under inert conditions to yield the prepolymerized catalyst I.

Polymerization

A 20-liter gas phase autoclave equipped with heating, cooling and stirring facilities was purged with nitrogen and heated to 85° C. 20-ml of a 10% solution of triethyl aluminum in heptane was introduced while the catalyst system comprising 20 ml of a 10% solution of triethyl aluminum in heptane, 5-ml of a 10% solution of di-isopropyl dimethoxy silane and the prepolymerized catalyst I was prereacted at 25° C. for 5 minutes. This prepolymerized catalyst slurry was introduced into the reactor and the reactor pressure increased to 3.5 bar with nitrogen. The polymerization was started by further increasing the reactor pressure to and keeping it constant at 9 bar with propylene. Simultaneously, a constant flow of 1-pentene at a rate of 1 g/min. was started. The 1-pentene flow was stopped after 25 minutes and the reaction continued for another 125 minutes. The polymer in the form of a powder was removed from the reactor, washed with iso propanol and acetone, filtered and dried for 12 hours in a vacuum oven at 80° C. The copolymer obtained had the following properties:

1-Pentene content of 4.7 mass %

Melt flow index of 2.7 g/10 min. as measured according to ASTM D 1238

Tensile strength at yield of 19.6 MPa as measured according to ASTM D 638M

Elongation at yield of 64% as measured according to ASTM 638M

Modulus of 550 MPa as measured according to ASTM 638M

Notched Izod impact strength of 53.4 kJ/m$^2$ (no break) as measured according to ASTM 256

Hardness of 56 as measured according to ASTM D 2240.

EXAMPLE 14

Catalyst J Preparation

In a closed glass vessel thoroughly purged with nitrogen, 2.76 mmol of triethyl aluminum were mixed with 29.22 ml of isohexane. After 10 min, 1105 mg of TiCl$_3$.1/3AlCl$_3$.1/3NPB catalyst was added to the vessel to form a catalyst slurry. 3.4 g of propylene were continuously supplied to the catalyst slurry at room temperature under stirring, over a period of 30 min, to produce a slurry of prepolymerized catalyst J.

Polymerization

A 1.5 l stainless steel reaction vessel equipped with a helical stirrer was thoroughly purged with nitrogen, and 1.5 mmol triethyl aluminum added thereto. After 10 min stirring, 2.6 ml of the prepolymerized catalyst slurry J were introduced, and the temperature increased to 67° C. 1.36 mmol of hydrogen were introduced. 5 ml 1-pentene was introduced through a preheating unit to vaporize it, and simultaneously a propylene flow into the vessel was started. The pressure was increased to 12 bar by means of the propylene, and a continuous supply of propylene was maintained at this constant pressure for 158 min, after which the polymerization was stopped. After depressurisation and cooling down to room temperature, the reactor was flushed with nitrogen. 116 g of a propylene/1-pentene copolymer were obtained which had the following properties:

1-Pentene content of 2.5 mass %

Melt flow index of 0.43 g/10 min. according to ASTM D 1238.

EXAMPLE 15

A 1.5 l stainless steel reaction vessel equipped with a helical stirrer was thoroughly purged with nitrogen, and 1.0 mmol triethyl aluminum added thereto. After 10 min stirring, 300 mg of TiCl$_3$.1/3AlCl$_3$.1/3NPB catalyst were introduced, and the temperature increased to 67° C. 5 ml 1-pentene was introduced through a preheating unit and after pressurising the reactor with propylene to 12 bar, 225 g of propylene were introduced at constant flow over a period of 152 min. through the same heating unit whereafter polymerization was stopped. After depressurisation and cooling down to room temperature, the reactor was flushed with nitrogen. 234 g of a propylene/1-pentene copolymer were obtained which had the following properties:

1-Pentene content of 1.4 mass %

Melt flow index of 0.19 g/10 min. according to ASTM D 1238.

EXAMPLE 16

A 1.5 l stainless steel reaction vessel equipped with a helical stirrer was thoroughly purged with nitrogen, and 2.9 mmol triethyl aluminum added thereto. After 10 min stirring, 5 ml of the prepolymerized catalyst slurry J were introduced, and the temperature increased to 67° C. 8.16 mmol of hydrogen were introduced. The reactor was pressurized with propylene to 8 bar, and homopolymerization effected for 4 min. Thereafter, 5 ml 1-pentene was introduced through a preheating unit and the pressure raised with propylene to 12 bar. Further copolymerization took place under a continuous supply of propylene at constant pressure for 66 min. At this stage another 5 ml of 1-pentene was added and further copolymerization took place under a continuous supply of propylene at constant pressure for another 120 min. The reaction was stopped. After depressurisation and cooling down to room temperature, the reactor was flushed with nitrogen. 156 g of a propylene/1-pentene copolymer were obtained which had the following properties:

1-Pentene content of 3.3 mass %

Melt flow index of 4.9 g/10 min. according to ASTM D 1238.

EXAMPLE 17

A 1.5 l stainless steel reaction vessel equipped with a helical stirrer was thoroughly purged with nitrogen, and 2.9 mmol triethyl aluminum added thereto. After 10 min stirring, 175 mg of TiCl$_3$.1/3AlCl$_3$.1/3NPB catalyst were introduced and the temperature increased to 67° C. 8.84 mmol of hydrogen was also added. The pressure was increased with propylene to 8 bar, and homopolymerization effected for 8 min. 5 ml 1-pentene was further introduced through a preheating unit and after pressurising the reactor with propylene to 12 bar, propylene was introduced at constant pressure for 60 min. 10 ml of 1-pentene was then added, and propylene was introduced at constant pressure for another 120 min. After depressurisation and cooling down to room temperature, the reactor was flushed with nitrogen. 90 g of a propylene/1-pentene copolymer were obtained which had the following properties:

1-Pentene content of 6.9 mass %

Melt flow index of 9.6 g/10 min. according to ASTM D 1238.

EXAMPLE 18

Catalyst K Preparation

In a closed glass vessel thoroughly purged with nitrogen, 3.78 mmol of triethyl aluminum were mixed with 55.39 ml of isohexane. After 10 min, 1005 mg of TiCl$_3$.1/3AlCl$_3$.1/3NPB catalyst were added. 3.3 g of propylene were continuously supplied to the catalyst slurry at room temperature under stirring, over a period of 30 min, to produce prepolymerized catalyst slurry K.

Polymerization

A 1.5 l stainless steel reaction vessel equipped with a helical stirrer was thoroughly purged with nitrogen and 3.4 mmol triethyl aluminum added thereto. After 10 min stirring, 12.1 ml of prepolymerized catalyst slurry K were introduced, and the temperature increased to 67° C. 8.84 mmol of hydrogen were introduced. 10 ml 1-pentene were introduced through a preheating unit and simultaneously a propylene flow into the vessel was started at a constant pressure of 1.3 MPa.

After 23 min another 10 ml of 1-pentene were added and propylene was further supplied under constant pressure for another 67 min after which the polymerization was stopped. After depressurisation and cooling down to room temperature, the reactor was flushed with nitrogen. 277 g of a propylene/1-pentene copolymer were obtained which had the following properties:

1-Pentene content of 3.8 mass %

Melt flow index of 2.5 g/10 min. according to ASTM D 1238.

EXAMPLE 19

A 1 liter stainless steel reactor vessel equipped with a helical stirrer was thoroughly purged with nitrogen and heated to 85° C. 0.1 g of an unsupported TiCl$_3$.1/3AlCl$_3$.1/3NPB catalyst was reacted with 1-ml of a 10 wt % solution of TEA in heptane to give an activated catalyst slurry. After 5 minutes 1 g of a propylene/1-pentene copolymer in the form of a fine powder was added to the slurry and thoroughly mixed. The catalyst system now in the form of a powder was added to the reactor and 30 mg of hydrogen was introduced. Propylene flow at a rate of 5 g/min and simultaneously, 1-pentene at a flow rate of 0.5 g/min was started and supplied to the reaction zone preheated in the same preheating unit. After 20 minutes the flows of both propylene and 1-pentene was stopped and the reaction continued for another 40 minutes. The polymerization vessel was cooled to room temperature and vented. 45 g of the copolymer were obtained which had the following properties:

1-Pentene content of 10.8 mass %

Melt flow index of 50 g/10 min. according to ASTM D 1238

Tensile strength at break of 30 MPa as measured according to ASTM D 638M

Impact strength of 36 kJ/m$^2$ (no break) as measured according to ASTM 256.

EXAMPLE 20

Catalyst L Preparation

To a 1-liter autoclave was added 30-ml of a 10% solution of tripropyl aluminum in heptane, 3-ml of a 10% solution of di-iso-propyl dimethoxy silane in heptane and 1.3 g of catalyst C and reacted for 5 minutes at 75° C. Propylene was fed to the reactor for 5 minutes at rates of 10 g/min. and polymerization continued for 30 minutes to form a catalyst slurry. This slurry was filtered and dried under inert conditions to yield the prepolymerized catalyst L.

Polymerization

A 1-liter gas phase autoclave equipped with heating, cooling and stirring facilities was purged with nitrogen and heated to 85° C. The catalyst system comprising the prepolymerized catalyst L, 1-ml of a 10% solution of triethyl aluminum in heptane and 0.3-ml of a 10% solution of di-iso-propyl dimethoxy silane in heptane was prereacted at 25° C. for 5 minutes. This catalyst slurry was introduced into the reactor, followed by 30 mg hydrogen. The polymerization was started by increasing the reactor pressure to and keeping it constant at 18 bar with propylene and simultaneously starting a constant flow of 1-pentene at a rate of 1 g/min. After 10 minutes the flow of 1-pentene was stopped and the reaction continued for another 50 minutes. The polymer in the form of a powder was removed from the reactor, washed with iso propanol and acetone, filtered and dried for 12 hours in a vacuum oven at 80° C. The 45 g of copolymer obtained had the following properties:

1-Pentene content of 6.2 mass %

Melt flow index of 50 g/10 min. as measured according to ASTM D 1238

Tensile strength at yield of 7.8 MPa as measured according to ASTM D 638M

Elongation at yield of 56% as measured according to ASTM 638M

Modulus of 205 MPa as measured according to ASTM 638M

Notched Izod impact strength of 36 kJ/m$^2$ (no break) as measured according to ASTM 256

Hardness of 58 as measured according to ASTM D 2240.

EXAMPLE 21

Catalyst M Preparation

To 1 g of a purified propylene/1-pentene copolymer containing 5% 1-pentene was added under inert conditions, 1-ml of a 10% solution of triethyl aluminum in heptane and 1-ml of a 10% solution of di-iso-propyl dimethoxy silane in heptane, followed by 1 g of catalyst G. The slurry was stirred for 5 minutes under vacuum to dry to yield catalyst M.

Polymerization

A 1-liter gas phase autoclave equipped with heating, cooling and stirring facilities was purged with nitrogen and heated to 85° C. Catalyst M was introduced into the reactor followed by 30 mg of hydrogen. The polymerization was started by increasing the reactor pressure to and keeping it constant at 18 bar with propylene and simultaneously starting a constant flow of 1-pentene at a rate of 1.5 g/min. After 10 minutes the flow of 1-pentene was stopped and the reaction continued for another 50 minutes. The polymer in the form of a powder was removed from the reactor, washed with iso propanol and acetone, filtered and dried for 12 hours in a vacuum oven at 80° C. The 65 g of copolymer obtained had the following properties:

1-Pentene content of 8.1 mass %

Melt flow index of 33 g/10 min. as measured according to ASTM D 1238.

EXAMPLE 22

Catalyst N Preparation

To 1 g of a purified propylene homopolymer was added under inert conditions, 1-ml of a 10% solution of triethyl aluminum in heptane and 1-ml of a 10% solution of di-iso-propyl dimethoxy silane in heptane, followed by 1 g of catalyst H. The slurry was stirred for 5 minutes at ambient temperature to yield catalyst slurry N.

Polymerization

A 1-liter gas phase autoclave equipped with heating, cooling and stirring facilities was purged with nitrogen and heated to 85° C. Catalyst slurry was introduced into the reactor and stirred under vacuum for 5 minutes to allow it to dry after which 10 mg of hydrogen was introduced. The polymerization was started by increasing the reactor pressure to and keeping it constant at 18 bar with propylene and simultaneously starting a constant flow of 1-pentene at a rate of 10 g/min. After 2 minutes the flow of 1-pentene was stopped and the reaction continued for another 58 minutes. The polymer in the form of a powder was removed from the reactor, washed with iso propanol and acetone, filtered and dried for 12 hours in a vacuum oven at 80° C. The copolymer obtained had the following properties:

1-Pentene content of 7.2 mass %

Melt flow index of 12.2 g/10 min. as measured according to ASTM D 1238.

EXAMPLE 23

Catalyst O Preparation

To a 1-liter autoclave was added 50-ml of a 10% solution of tripropyl aluminum in heptane, 5-ml of a 10% solution of di-iso-propyl dimethoxy silane in heptane and 1 g of catalyst G and reacted for 5 minutes at 75° C. Propylene and 1-pentene was fed to the reactor for 5 minutes at rates of 10 g/min. and 1 g/min. respectively and polymerization continued for 30 minutes to form a catalyst slurry. This slurry was filtered and dried under inert conditions to yield the prepolymerized catalyst O.

Polymerization

A 1-liter gas phase autoclave equipped with heating, cooling and stirring facilities was purged with nitrogen and heated to 85° C. The catalyst system comprising the prepolymerized catalyst O, 3-ml of a 10% solution of tripropyl aluminum in heptane and 1-ml of a 10% solution of di-iso-propyl dimethoxy silane in heptane was prereacted at 25° C. for 5 minutes. This catalyst slurry was introduced into the reactor and stirred under vacuum for 5 minutes to allow it to dry after which 20 mg of hydrogen was introduced. The polymerization was started by simultaneously starting a flow of propylene at a rate of 20 g/min and a flow of 1-pentene at a rate of 10 g/min. After 2 minutes the flow of 1-pentene was stopped and the reaction continued for another 58 minutes. The polymer in the form of a powder was removed from the reactor, washed with iso propanol and acetone, filtered and dried for 12 hours in a vacuum oven at 80° C. The copolymer obtained had the following properties:

1-Pentene content of 14.02 mass %

Melt flow index of 18 g/10 min. as measured according to ASTM D 1238.

EXAMPLE 24

Catalyst P Preparation

To a 1-liter autoclave was added 50-ml of a 10% solution of triethyl aluminum in heptane, 5-ml of a 10% solution of di-iso-propyl dimethoxy silane in heptane and 1 g of catalyst H and reacted for 5 minutes at 75° C. Propylene and 1-pentene was fed to the reactor for 5 minutes at rates of 10 g/min. and 1 g/min. respectively and polymerization continued for 30 minutes to form a catalyst slurry. This slurry was filtered and dried under inert conditions to yield the prepolymerized catalyst P.

Polymerization

A 1-liter gas phase autoclave equipped with heating, cooling and stirring facilities was purged with nitrogen and heated to 85° C. The catalyst system comprising the prepolymerized catalyst P, 3-ml of a 10% solution of diethyl aluminum chloride in heptane and 1-ml of a 10% solution of di-iso-propyl dimethoxy silane in heptane was prereacted at 25° C. for 5 minutes. This catalyst slurry was introduced into the reactor and stirred under vacuum for 5 minutes to allow it to dry after which 20 mg of hydrogen was introduced. The polymerization was started by simultaneously starting a flow of propylene at a rate of 20 g/min and a flow of 1-pentene at a rate of 10 g/min. After 2 minutes the flow of 1-pentene was stopped and the reaction continued for another 58 minutes. The polymer in the form of a powder was removed from the reactor, washed with iso propanol and acetone, filtered and dried for 12 hours in a vacuum oven at 80° C. The 85 g of copolymer obtained had the following properties:

1-Pentene content of 14.2 mass %

Melt flow index of 25 g/10 min. as measured according to ASTM D 1238.

EXAMPLE 25

Catalyst Q Preparation

To 1 g of a purified propylene homopolymer in 5-ml of heptane was added under inert conditions, 1 g of catalyst H. The slurry was stirred under vacuum to dry to yield catalyst Q.

Polymerization

A 1-liter gas phase autoclave equipped with heating, cooling and stirring facilities was purged with nitrogen and heated to 85° C. The catalyst system comprising 3-ml of a 10% solution of triethyl aluminum in heptane, 1-ml of a 10% solution of di-iso-propyl dimethoxy silane in heptane and catalyst Q, was introduced into the reactor in that order and stirred for 5 minutes after which 20 mg of hydrogen was introduced. The polymerization was started by simultaneously starting a flow of propylene at a rate of 20 g/min and a flow of 1-pentene at a rate of 10 g/min. After 2 minutes the flow of 1-pentene was stopped and the reaction continued for another 58 minutes. The polymer in the form of a powder was removed from the reactor, washed with iso propanol and acetone, filtered and dried for 12 hours in a vacuum oven at 80° C. The 75 g of copolymer obtained had the following properties:

1-Pentene content of 11.8 mass %

Melt flow index of 21 g/10 min. as measured according to ASTM D 1238.

EXAMPLE 26

Catalyst R Preparation

To 1 g of a purified propylene/1-pentene copolymer containing 5% 1-pentene was added under inert conditions, 1-ml of a 10% solution of triethyl aluminum in heptane and 1-ml of a 10% solution of di-iso-propyl dimethoxy silane in heptane, followed by 1 g of catalyst G. The slurry was stirred for 5 minutes under vacuum to dry to yield catalyst R.

Polymerization

A 1-liter gas phase autoclave equipped with heating, cooling and stirring facilities was purged with nitrogen and heated to 85° C. The catalyst system comprising 3-ml of a 10% solution of triethyl aluminum in heptane, 1-ml of a 10% solution of di-iso-propyl dimethoxy silane in heptane and catalyst R was introduced into the reactor in that order and stirred for 5 minutes under vacuum to dry after which 20 mg of hydrogen was introduced. The polymerization was started by simultaneously starting a flow of propylene at a rate of 20 g/min and a flow of 1 pentene at a rate of 10 g/min. After 2 minutes the flow of 1-pentene was stopped and the reaction continued for another 58 minutes. The polymer in the form of a powder was removed from the reactor, washed with iso propanol and acetone, filtered and dried for 12 hours in a vacuum oven at 80° C. The 35 g of copolymer obtained had the following properties:

1-Pentene content of 10.2 mass %

Melt flow index of 19 g/10 min. as measured according to ASTM D 1238.

What is claimed is:

1. A process for producing a propylene/1-pentene polymer, which process comprises reacting propylene, as a first monomer reactant, with 1-pentene, as a second monomer reactant, in a reaction zone, in the presence of a Ziegler-Natta catalyst or catalyst system, to form the propylene/1-pentene polymer, with the reactants being in the vapour phase in the reaction zone while. the reaction is in progress, with no liquid component being present in the reaction zone while the reaction is in progress, and with (i) both the monomer reactants being preheated separately to ensure that they are in the vapour phase, and the monomer reactants being introduced separately into the reaction zone in the vapour phase; or (ii) at least one of the monomer reactants being introduced into the reaction zone partly in the vapour phase, so that part of that monomer is introduced into the reaction zone in a liquid phase, with this part being further evaporated in the reaction zone so that the reaction is performed with both monomer reactants in the vapour phase; or (iii) the propylene being introduced into the reaction zone in the vapour phase, while the 1-pentene is introduced into the reaction zone in the liquid phase in such an amount that it evaporates in the reaction zone so as also to be in the vapour phase, with the reaction being performed with both monomer reactants in the vapour phase.

2. A process according to claim 1, wherein the reaction is effected at a reaction temperature which is in the range of 10° C. to 130° C., and at a reaction pressure which is in the range of 1 to 60 kg/cm².

3. A process according to claim 2, wherein the reaction temperature is in the range of 60° C. to 90° C., while the reaction pressure is in the range of 6 to 30 kg/cm².

4. A process according to claim 1, wherein the reaction zone is a stirred reaction zone in which there is upward movement of polymer particles which are produced therein, without sedimentation of these particles at the bottom of the reaction zone occurring.

5. A process according to claim 1, wherein the reaction is continued for between 20 minutes and 200 minutes to obtain a 1%–99% conversion of the monomer reactants.

6. A process according to claim 1, wherein the 1-pentene is that obtained from a Fischer-Tropsch synthesis reaction.

7. A process according to claim 1, wherein the catalyst system is used, with the catalyst system comprising a titanium based Ziegler-Natta catalyst and, as a cocatalyst, an organo-aluminium compound, with the Ziegler-Natta catalyst of the catalyst system being obtained by, in a support preparation step, activating a magnesium chloride support by treating magnesium chloride having a water content between 0.02 and 2 mole of water per mole of magnesium chloride, with an ether selected from linear ethers having a total number of carbon atoms between 8 and 16, to obtain a partially activated magnesium chloride; adding an alkyl aluminium to the partially activated magnesium chloride such that the amount of the alkyl aluminium added complies with the equation A>B+C+D where A represents the total moles of aluminium alkyl, B represents the moles of magnesium chloride, C represents the total moles of ether and D represents the total moles of water; and severe washing with a saturated hydrocarbon solvent until none of the initially introduced ether remains, to obtain an activated magnesium chloride support, and thereafter, in a catalyst loading step, loading titanium tetrachloride onto the activated magnesium chloride support in the presence of a suitable electron donor.

8. A process according to claim 1, wherein a catalyst system is used, with the catalyst system comprising a titanium based Ziegler-Natta catalyst and, as a cocatalyst, an organo-aluminium compound, with the Ziegler-Natta catalyst of the catalyst system being that obtained by, in a support preparation step, activating a magnesium chloride support by with an ether selected from linear ethers having a total number of carbon atoms between 8 and 16, to obtain a partially activated magnesium chloride; adding an alcohol selected from linear alcohols having a total number of carbon atoms between 2 and 8, to obtain a further partially activated magnesium chloride in solution, followed by saturating the solution under reduced pressure and cooling it to allow the further partially activated support to crystallize; severe washing with a saturated hydrocarbon solvent; adding an alkyl aluminium to the partially activated magnesium chloride such that the amount of the alkyl aluminium added complies with the equation A>B+C+D+E where A represents the total moles of aluminium alkyl, B represents the moles of magnesium chloride, C represents the total moles of ether and D represents the total moles of water, and E represents total moles of alcohol; and severe washing with a saturated hydrocarbon solvent until no alkyl aluminium is detected in the washing, to obtain an activated magnesium chloride support, and thereafter, in a catalyst loading step, loading titanium tetrachloride on to the activated magnesium chloride support in the presence of a suitable electron donor.

9. A process according to claim 1, wherein a catalyst system is used, with the catalyst system comprising a titanium based Ziegler-Natta catalyst and, as a cocatalyst, an organo-aluminium compound, with the Ziegler-Natta catalyst of the catalyst system being obtained by, in a support preparation step, activating a magnesium chloride support by treating magnesium chloride with an ether selected from linear ethers having a total number of carbon atoms between 8 and 16, to obtain a partially activated magnesium chloride; adding an alcohol selected from linear alcohols having a total number of carbon atoms between 2 and 8, to obtain further partially activated magnesium chloride in solution, followed by saturating the solution under reduced pressure and cooling it slowly to allow the further partially activated support to crystallize; severe washing with the same ether; and severe washing with a saturated hydrocarbon solvent, to obtain an activated magnesium chloride support, and thereafter, in a catalyst loading step, loading titanium tetrachloride on to the activated magnesium chloride support in the presence of a suitable electron donor.

10. A process for producing a propylene/1-pentene polymer, which process comprises reacting propylene, as a first monomer reactant, with 1-pentene, as a second monomer reactant, in a reaction zone, in the presence of a Ziegler-Natta catalyst or catalyst system, to form the propylene/1-pentene polymer, with the reactants being in the vapor phase in the reaction zone while the reaction is in progress, with no liquid component being present in the reaction zone while the reaction is in progress, and with the Ziegler-Natta catalyst being that obtained by, in a support preparation step, activating a magnesium chloride support by treating magnesium chloride having a water content between 0.02 and 2 mole of water per mole of magnesium chloride, with an ether selected from linear ethers having a total number of carbon atoms between 8 and 16, to obtain a partially activated magnesium chloride; adding an alkyl aluminium to the partially activated magnesium chloride such that the amount of the alkyl aluminium added complies with the equation A>B+C+D where A represents the total moles of aluminium alkyl, B represents the moles of magnesium chloride, C represents the total moles of ether and D represents the total moles of water; and severe washing with a saturated hydrocarbon solvent until none of the initially introduced ether remains, to obtain an activated magnesium chloride support, and thereafter, in a catalyst loading step, loading titanium tetrachloride onto the activated magnesium chloride support in the presence of a suitable electron donor.

11. A process for producing a propylene/1-pentene polymer, which process comprises reacting propylene, as a first monomer reactant, with 1-pentene, as a second monomer reactant, in a reaction zone, in the presence of a Ziegler-Natta catalyst or catalyst system, to form the propylene/1-pentene polymer, with the reactants being in the vapor phase in the reaction zone while the reaction is in progress, with no liquid component being present in the reaction zone while the reaction is in progress, and with the Ziegler-Natta catalyst being that obtained by, in a support preparation step, activating a magnesium chloride support with an ether selected from linear ethers having a total number of carbon atoms between 8 and 16, to obtain a partially activated magnesium chloride; adding an alcohol selected from linear alcohols having a total number of carbon atoms between 2 and 8, to obtain a further partially activated magnesium chloride in solution, followed by saturating the solution under reduced pressure and cooling it slowly to allow the further partially activated support to crystallize; severe washing with a saturated hydrocarbon solvent; adding an alkyl aluminium to the partially activated magnesium chloride such that the amount of the alkyl aluminium added complies with the equation A>B+C+D+E where A represents the total moles of aluminium alkyl, B represents the moles of magnesium chloride, C represents the total moles of ether and D represents the total moles of water, and E represents total moles of alcohol; and severe washing with a saturated hydrocarbon solvent until no alkyl aluminium is detected in the washing, to obtain an activated magnesium chloride support, and thereafter, in a catalyst loading step, loading titanium tetrachloride on to the activated magnesium chloride support in the presence of a suitable electron donor.

12. A process for producing a propylene/1-pentene polymer, which process comprises reacting propylene, as a first monomer reactant, with 1-pentene, as a second monomer reactant, in a reaction zone, in the presence of a Ziegler-Natta catalyst or catalyst system, to form the propylene/1-pentene polymer, with the reactants being in the vapor phase in the reaction zone while the reaction is in progress, with no liquid component being present in the reaction zone while the reaction is in progress, and with the Ziegler-Natta catalyst being that obtained by, in a support preparation step, activating a magnesium chloride support by treating magnesium chloride with an ether selected from linear ethers having a total number of carbon atoms between 8 and 16, to obtain a partially activated magnesium chloride; adding an alcohol selected from linear alcohols having a total number of carbon atoms between 2 and 8, to obtain further partially activated magnesium chloride in solution, followed by saturating the solution under reduced pressure and cooling it slowly to allow the further partially activated support to crystallize; severe washing with the same ether; and severe washing with a saturated hydrocarbon solvent, to obtain an activated magnesium chloride support, and thereafter, in a catalyst loading step, loading titanium tetrachloride on to the activated magnesium chloride support in the presence of a suitable electron donor.

13. A process according to claim 10, wherein the catalyst system is used, and wherein the catalyst system comprises a titanium-based Ziegler-Natta catalyst and an organo aluminum compound as a cocatalyst.

14. A process according to claim 7, wherein the catalyst loading comprises the following steps:
   i) adding the electron donor under stirring;
   ii) adding the titanium tetrachloride and stirring under reflux followed by cooling; and
   iii) adding an ester.

15. A process according to claim 7, wherein the catalyst loading comprises the following steps:
   i) adding titanium tetrachloride and stirring under reflux followed by cooling;
   ii) adding the electron donor under stirring; and
   iii) adding titanium tetrachloride and stirring under reflux followed by cooling.

16. A process according to claim 14, wherein the electron donor comprises one or more esters.

17. A process according to claim 14, wherein the electron donor comprises one or more alcohols.

18. A process according to claim 7, wherein the cocatalyst is selected from the group consisting of a trialkyl aluminium, a trialkenyl aluminium, a partially halogenated alkyl aluminium, an alkyl aluminium sesquihalide, and an alkyl aluminium halide.

19. A process according to claim 1, wherein the Ziegler-Natta catalyst or catalyst system is a propylene-based prepolymerized Ziegler-Natta catalyst or catalyst system obtained by prepolymerizing the Ziegler-Natta catalyst in solid particulate form in a slurry phase, with the catalyst being slurried in purified isohexane, with the concentration of the catalyst in the slurry being 2000–4000 mg of catalyst per 100 g of solvent, and with the prepolymerization optionally being effected in the presence of triethyl aluminium as a cocatalyst, in which case the ratio of the Ziegler-Natta catalyst to the triethyl aluminium is 1000 mg catalyst per 3 to 5 mmol triethyl aluminum.

20. A process according to claim 19, wherein the Ziegler-Natta catalyst or catalyst system is prepolymerized with a mixture of propylene and 1-pentene in a mass proportion between 99.7:0.3 and 85:15.

21. A process according to claim 1, wherein the Ziegler-Natta catalyst or catalyst system is a polymer diluted Ziegler-Natta catalyst or catalyst system obtained by adding a propylene/1-pentene polymer having a 1-pentene content between 0.1% and 10% by weight and being in powder form, to a suspension of the Ziegler-Natta catalyst, in powder form, in an inert liquid hydrocarbon, the resultant slurry mixed, and the solvent thereafter evaporated to obtain the polymer diluted catalyst in powder form, with triethyl aluminium optionally being used as a cocatalyst, in which case the proportion of the cocatalyst is such that the atomic ratio of aluminium to titanium in the catalyst system is between 1:1 and 5000:1.

22. A process for producing a propylene/1-pentene polymer which process comprises reacting propylene as a first monomer reactant, with 1-pentene, as a second monomer reactant, in a reaction zone, in the presence of a prepolymerized or polymer diluted Ziegler-Natta catalyst or catalyst system, to form the propylene/1-pentene polymer, with the reactants being in the vapour phase in the reaction zone while the reaction is in progress, and with no liquid component being present in the reaction zone while the reaction is in progress.

23. A process according to claim 1, wherein all the 1-pentene is introduced into the reaction zone at the start of the reaction, while the propylene is introduced continuously into the reaction zone over the duration of the reaction at a constant pressure and/or at a constant flow rate.

24. A process according to claim 1, wherein the 1-pentene is introduced intermittently into the reaction zone, while the propylene is introduced continuously into the reaction zone over the duration of the reaction at a constant pressure and/or at a constant flow rate.

25. A process according to claim 1, wherein both the propylene and 1-pentene are introduced continuously into the reaction zone at a constant pressure and/or at a constant flow rate.

26. A process for producing a propylene/1-pentene polymer, which process comprises reacting, for a reaction period, propylene, as a first monomer reactant, with 1-pentene, as a second monomer reactant, in vapour phase in a reaction zone in the presence of a Ziegler-Natta catalyst or catalyst system, to form the propylene/1-pentene polymer, with all the 1-pentene being introduced into the reaction zone at the beginning of the reaction period, with the ratio of propylene to 1-pentene in the reaction zone being varied continuously over the reaction period, with all the reactants being in the vapour phase in the reaction zone while the reaction is in progress, and with no liquid component being present in the reaction zone while the reaction is in progress.

27. A process for producing a propylene/1-pentene polymer which process comprises reacting, for a reaction period, propylene as a first monomer reactant, with 1-pentene, as a second monomer reactant, in vapour phase in a reaction zone in the presence of a Ziegler-Natta catalyst or catalyst system, by introducing the 1-pentene intermittently into the reaction zone and continuously modifying the ratio of propylene to 1-pentene in the reaction zone over the reaction period, to form the propylene/1-pentene polymer, with all the reactants being in the vapour phase in the reaction zone while the reaction is in progress, and with no liquid component being present in the reaction zone while the reaction is in progress.

28. A process according to claim 1 wherein, in a first step, at least some of the propylene is homopolymerized in the reaction zone whereafter, in a second step, the 1-pentene, or the 1-pentene and the balance of the propylene, is added to the reaction zone.

29. A process according to claim 28, wherein an amount of the propylene is first homopolymerized in the reaction zone in the first step, with the second step comprising reacting the balance of the propylene with 1-pentene by introducing the balance of the 1-pentene at the beginning of the second step and by continuously introducing the propylene into the reaction zone under constant pressure and/or under constant flow, thereby continuously varying the ratio of propylene to 1-pentene in the reaction zone.

30. A process according to claim 28, wherein an amount of the propylene is first homopolymerized in the reaction zone in the first step, with the second step comprising reacting the balance of the propylene with 1-pentene by introducing differing amounts of the balance of the 1-pentene intermittently during the second step and by continuously introducing the propylene into the reaction zone under constant flow or constant pressure, thereby continuously varying the ratio of propylene to 1-pentene in the reaction zone.

31. A process according to claim 28, wherein an amount of the propylene is first homopolymerized in the reaction zone in the first step, with the second step comprising reacting the balance of the propylene with 1-pentene by introducing both the balance of the propylene and the 1-pentene continuously into the reaction zone at constant pressure and/or constant flow.

32. A process for preparing a propylene/1-pentene polymer which process comprises, in a first step, homopolymerizing propylene in a reaction zone, and thereafter, in a second step, adding 1-pentene, or propylene and 1-pentene, to the reaction zone, with both steps being effected in vapour phase in the presence of a Ziegler-Natta catalyst or catalyst system, to form the propylene/1-pentene polymer, with all the reactants being in the vapour phase in the reaction zone while the reaction is in progress, and with no liquid component being present in the reaction zone while the reaction is in progress.

* * * * *